United States Patent [19]
Berson et al.

[11] Patent Number: 5,420,924
[45] Date of Patent: May 30, 1995

[54] SECURE IDENTIFICATION CARD AND METHOD AND APPARATUS FOR PRODUCING AND AUTHENTICATING SAME BY COMPARISON OF A PORTION OF AN IMAGE TO THE WHOLE

[75] Inventors: William Berson, Westport; Shailendra Kumar, Stamford, both of Conn.

[73] Assignee: Pitney Bowes Inc., Stamford, Conn.

[21] Appl. No.: 53,945

[22] Filed: Apr. 26, 1993

[51] Int. Cl.⁶ .............................................. H04K 1/00
[52] U.S. Cl. ...................................... 380/23; 380/25; 380/50; 235/380; 340/825.34
[58] Field of Search ..................... 380/21, 23, 24, 25, 380/30, 49, 50, 51, 54, 55; 235/379, 380; 382/2; 340/825.33, 825.34

[56] References Cited

U.S. PATENT DOCUMENTS

| | | | |
|---|---|---|---|
| 4,811,408 | 3/1989 | Goldman | 382/2 |
| 4,879,747 | 11/1989 | Leighton | 380/23 |
| 4,972,476 | 11/1990 | Nathans | 380/23 |
| 4,991,205 | 2/1991 | Lemelson | 340/825.33 X |
| 4,993,068 | 2/1991 | Piosenka | 380/23 |
| 4,995,081 | 2/1991 | Leighton et al. | 380/23 |
| 5,214,699 | 5/1993 | Monroe et al. | 380/23 |
| 5,241,600 | 8/1993 | Hillis | 380/23 |

*Primary Examiner*—Tod R. Swann
*Attorney, Agent, or Firm*—Robert H. Whisker; Melvin J. Scolnick

[57] ABSTRACT

An identification card and method and apparatus for producing and authenticating such an identification card. An object or other entity for which the identification card will evidence identity, status or characteristics is scanned to produce a digital signal a portion of which is compressed, encrypted, and coded and which is recorded on a magnetic strip on the identification card. The image is also printed or otherwise embodied onto another portion of the identification card. A text message maybe appended to the signal before it is encrypted and also printed as plain text on the identification card. In one embodiment the signal representing the image is encrypted using a public key encryption system and the key is downloaded from a center. This key maybe changed from time to tome to increase security. To facilitate authentication the corresponding decryption key is encrypted with another key and incorporated on the card. To validate the card the coded message is scanned, decoded, decrypted, expanded and displayed. The card may then be authenticated by comparison of the displayed representation stroboscopically superimposed on the image and the displayed text message with the image and text message printed on the card.

28 Claims, 3 Drawing Sheets

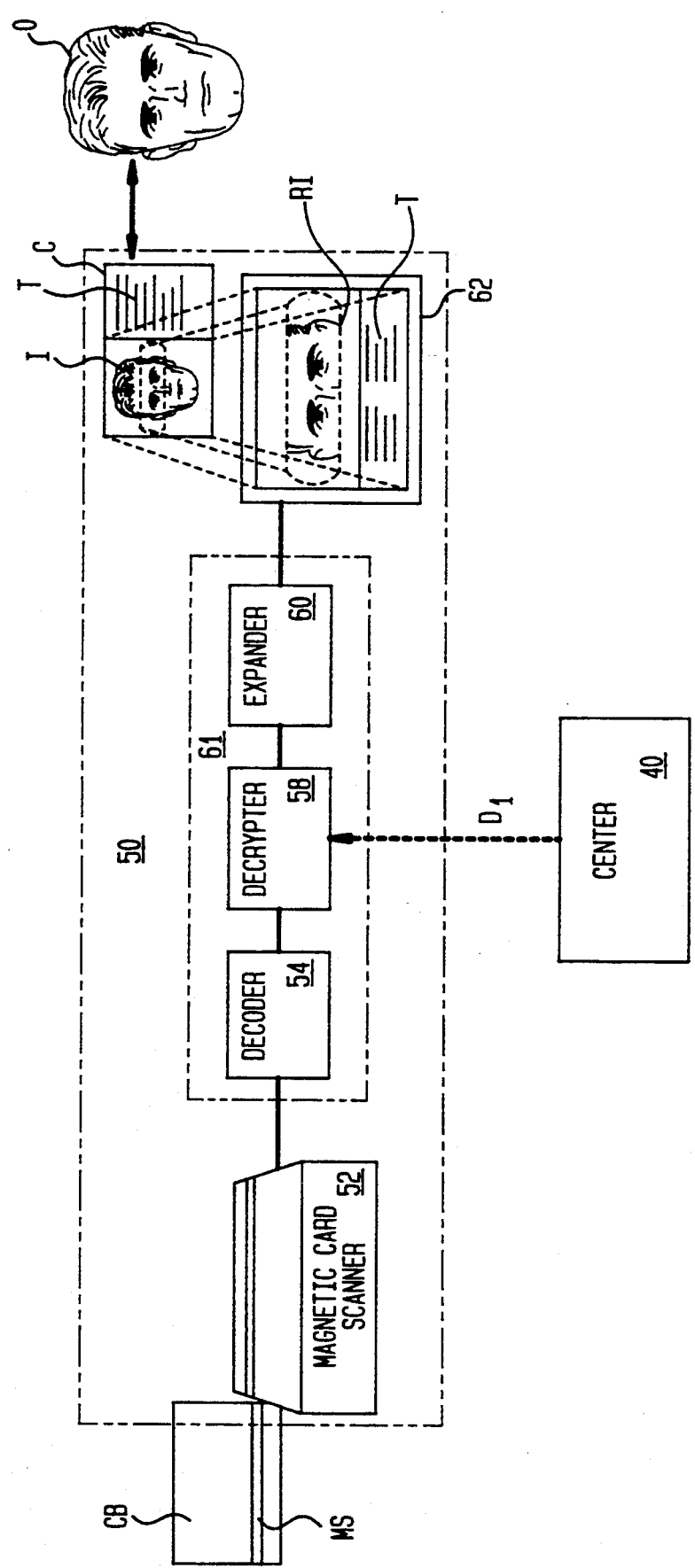

SECURE IDENTIFICATION CARD AND METHOD AND APPARATUS FOR PRODUCING AND AUTHENTICATING SAME BY COMPARISON OF A PORTION OF AN IMAGE TO THE WHOLE

BACKGROUND OF THE INVENTION

The subject invention relates to an identification card or similar item which serves as evidence of the identity or status of an object or other entity. More particularly, it relates to an identification card or similar item which has a high degree of security against forgery or tampering, and to methods and apparatus for producing and authenticating such cards. The subject invention relates to, and is an improvement on the invention disclosed in, application Ser. No. 07/979,081; filed: Nov. 20, 1992; to: James R. Marcus.

(As used herein the term "identification card" will preferably refer to an item similar to an identification badge of the type used by businesses to identify their employees, but it is within the contemplation of the subject invention, and as used herein the term "identification card" shall include, without limitation, documents, magnetic disks, CD's, or smartcards, or any other suitable item which may record an image together with related data and which may be associated with an object or other entity to be identified).

The identification of objects or other entities is a problem at least as old as history. In modern times the most prevalent solution to this problem is the identification card which serves to establish the identity of the bearer, as well as usually some characteristic, status, or attribute of the bearer. Examples are the employee badge, as noted above, and, most commonly, the driver license. Typically, such identification cards will include a picture of the nominal bearer as well as relevant information in text form.

While identification cards and the like have generally proven useful for the day to day conduct of affairs nevertheless they are still subject to forgery or tampering, and indeed a moderately sized illegal industry exists for the purpose of providing false identification documents.

For applications where a high degree of security of identification is required, efficient techniques have been developed to recognize fingerprints, voice patterns, retinal patterns, or other characteristics of individuals, such systems are highly successful in uniquely identifying individuals known to the system, but are subject to the disadvantages of requiring highly sophisticated, expensive sensors, which are typically not mobile, and Which must be connected to a database which identifies selected individuals in terms of physical characteristics such as fingerprints. Such a database must generally be centrally located, both to protect if from tampering and to facilitate updating. Thus, these sophisticated systems are generally limited to restricting access to secure areas.

As is apparent from the above discussion the most common application of identification cards is to identify persons. However, the problem of identification may extend to a very broad class of objects or other entities. Thus, it may be desirable to be able to establish that a particular item has been inspected, or passed through customs, or was produced by a particular company. Similarly, it may be desirable to have secure evidence of the provenance of an artwork, or the pedigree of an animal, or that a person, animal, or plant is free from disease. Such applications, and others which will be apparent to those skilled in the art are within the contemplation of the subject invention.

Perhaps because it relates to information, rather than tangible objects, the identification or authentication of documents or other forms of information has been dealt with perhaps more successfully in the past; usually by use of some form of encryption. Thus, U.S. Pat. No. 4,853,961; for: "Reliable Document Authentication System": Pastor; issued: Aug. 1, 1989, discloses a system wherein a document is authenticated by encryption using a public key encryption system. U.S. Pat. No. 4,637,051; to Clark discloses a postage meter having an indicia which authenticated by encryption. Many other applications of encryption to authenticate information will be known to those skilled in the art.

One approach to the problem of providing secure identification cards is disclosed in the above referenced application to Marcus. This applications discloses an identification card which includes an image of an object to be identified (typically a person's face) on one side, and an encrypted signal representing a compressed representation of that image on the other side. To validate the card the encrypted data is decrypted and a representation of the print image is generated and displayed for comparison with the printed image on the first side.

While this technique has been demonstrated and is generally considered satisfactory, it suffers from the disadvantage that, even with compression, the representation of the image required a large amount of data, typically more than 1000 bytes This amount of data requires sophisticated, high-density coding techniques, such as the known PDF-417 two-dimensional bar code, to allow all of the data to be incorporated onto a standard sized identification card.

Thus it would be desirable if the amount of data which is needed to encode the representation of the image could be reduced so that, for example, the representation of the image could be recorded on magnetic stripes such as those that are commonly used on standard credit cards.

Thus it is an object of the subject invention to provide an identification card to identify an object or other entity, which card is secure against tampering and forgery, and which card requires a substantially reduced amount of data to record the representation of the image.

BRIEF SUMMARY OF THE INVENTION

The above object is achieved and the disadvantages of the prior art are overcome in accordance with the subject invention by means of a method and apparatus for producing an identification card and for validating that identification card. Apparatus for producing an identification card includes a scanner for producing a first signal representative of an image of the object or other entity to be identified, and a printer responsive to the scanner or printing the image on a first portion of the identification card. The apparatus further includes an extractor to extract a first portion of the first signal representative of a portion of the image, and an encrypter for encrypting a second signal, which is derived, at least in part, from the first signal, and which includes a representation of the extracted portion of the image; and a coder for incorporating a coded representation of the encryption of the second signal onto a second portion of the identification card.

Apparatus for validating an identification card so produced includes a reader for reading the coded representation of the second signal from the card, a decoder for decoding the coded representation of the second signal, a decrypter for decrypting the decoded signal, and a display for displaying the representation of the portion of the image incorporated in the second signal superimposed on the image.

(As used herein the term "superimposed" (means that images are displayed in the same area of the viewing field with the same orientation.)

In accordance with the method of the subject invention the object to be identified is scanned to produce the first signal and a printer is controlled by the first signal to print the image of the object on the first portion of the identification card. The second signal, which is derived at least in part from the first signal, and which includes a representation of a portion of the image is encrypted and coded and incorporated in the second portion of the identification card.

Once produced the card is then validated by reading the coded representation of the second signal from the identification card, decoding and decrypting the second signal, and controlling a display in accordance with the decrypted second signal to display the representation of the portion of image which is included in the second signal superimposed on the printed image. The displayed representation of the image and the printed image on the first portion of the card are then compared to validate the card, and the printed image is compared to the object to confirm its identity.

In accordance with one aspect of the subject invention the displayed representation is stereographically superimposed on the printed image.

(As used herein the term "stereographically superimposed" means that the superimposed images are displayed alternately, switching at a frequency selected so that small differences between the images will cause the apparent image to flicker. This technique is well known and is used to detect small changes which might not otherwise be apparent in images. For example, it is used to study astronomical photographs to detect the small changes in successive images of the sky which may reveal a new astronomical object. Further description of this technique is not believed necessary for an understanding of the subject invention.)

In accordance with another aspect of the subject invention the portion of the image may be a fixed, predetermined portion.

In accordance with another aspect of the subject invention the portion of the image may be a variable portion and data identifying the variable portion may be included with the second signal.

In accordance with another aspect of the subject invention the portion of the image may be selected with respect to a feature of the image, and data identifying the selected portion may be included with the second signal.

In accordance with another aspect of the subject invention the portion of the image may be an abstraction derived from the image.

(By "abstraction" herein is meant a second image derived from a first image in a manner which reduces the amount of information in the image while still preserving selected characteristics of the image. For example an abstraction could be formed from an image by "tracing" the boundaries between areas where there is a sharp change in contrast.)

In accordance with another aspect of the subject invention the second signal includes a compressed form of the first signal.

(Signal compression is well known to those skilled in the art, and in the case of digital signals, involves the application of a predetermined algorithm to a signal to reduce the number of bytes which must be transmitted or processed, while still retaining substantially all of the information represented by the signal.)

In accordance with another aspect of the subject invention the second signal is encrypted using an encryption key $E_i$, for a public key encryption system.

In accordance with still another aspect of the subject invention a decryption key, $D_i$, which corresponds to the key, $E_i$, is encrypted with a second encryption key, $E_1$, for the public key encryption system, and the resulting encrypted decryption key $E_1[D_i]$, is appended to the encrypted second signal prior to incorporation of the second signal into the second portion of the identification card.

In accordance with yet still another aspect of the second invention the apparatus for validating the identification card stores a decryption key $D_1$, corresponding to key $E_1$ and the decryption of the encrypted second signal includes the step of decrypting the encrypted key, $E_1[D_i]$, using the decryption key, $D_1$, to obtain the decryption key $D_i$, which may then be used to decrypt the encrypted second signal.

Thus, At can be seen that the subject invention achieves the above stated object by providing a method and apparatus for producing an identification card which includes an image which may be easily compared to the object or other entity whose identity is to be verified, and which is highly resistant to forgery or tampering, while reducing the amount of data which must be incorporated on the card. Other objects and advantages of the subject invention will be readily apparent to those skilled An the art from consideration of the attached drawings and the detailed description set forth below.

BRIEF DESCRIPTION OF THE DRAWINGS

FIG. 3 is a schematic block diagram of an apparatus for validating an identification card produced in accordance with the subject invention.

DETAILED DESCRIPTION OF THE PREFERRED EMBODIMENTS OF THE SUBJECT INVENTION

Figure 1:
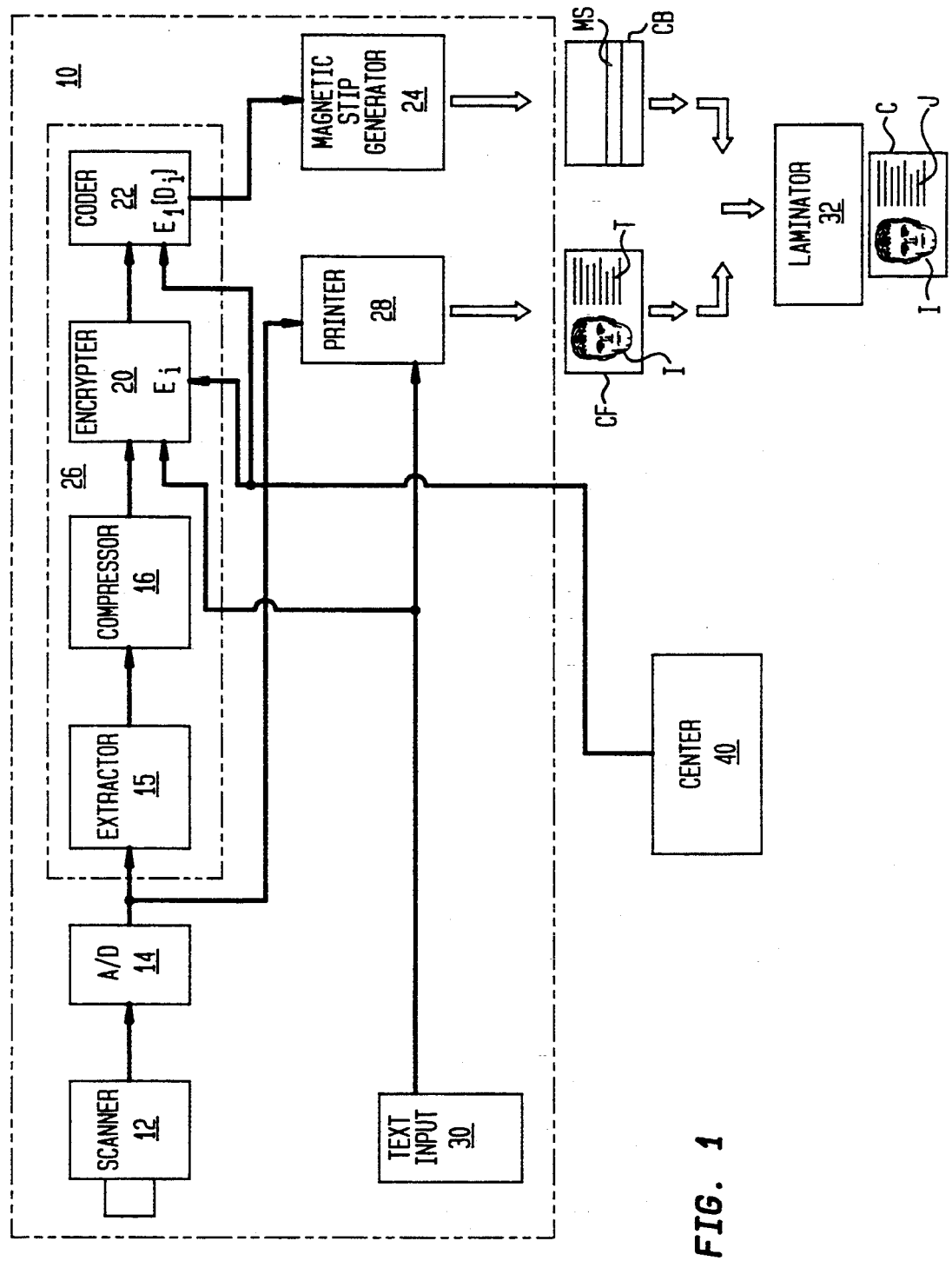
FIG. 1 is a schematic block diagram of an apparatus for producing an identification card in accordance with the subject invention.
Figure 1:
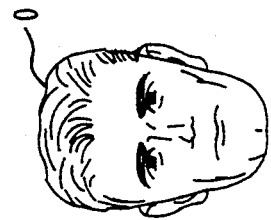
Figure 2A:
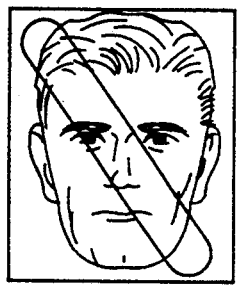
FIGS. 2A, 2B, and 2C illustrate various ways in which a portion of an image may be selected for extraction.
Figure 2B:
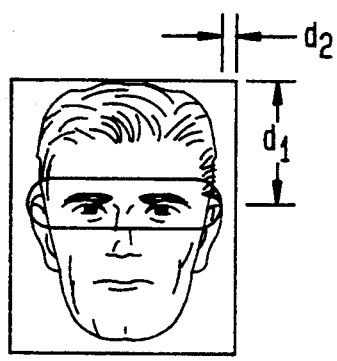
Figure 2C:
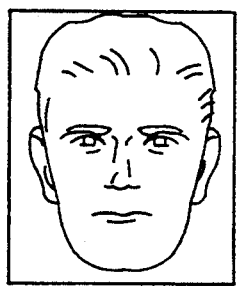

FIG. 1 shows a schematic block diagram of apparatus 10 for producing an identification card C. A person O (or other object or entity) for whom the identification card is intended is scanned by a conventional video scanner 12 to produce a first signal representative of that person's image. Preferably, the first signal is then converted to a digital form by an analog-to-digital convertor 14 for processing in the digital domain.

The first signal is then input to extractor 15 which extracts a portion of the first signal representative of a portion of the person's image. Extraction of a portion of a signal representative of an image may be straight forward application of the "windowing" technology familiar to users of personal computers and those who watch split-screen television broadcasts and need not be discussed further here for an understanding of the subject invention.

FIGS. 1A, 1B and 1C show preferred methods of extracting a portion of the first signal which is representative of a portion of the person's image. In FIG. 1A a fixed, predetermined portion of the image is shown as a diagonal portion running from the upper left to the lower right of the full image. Use of a fixed portion has the advantage that it does not require any additional information for the identification and validation process, as will be described further below.

Another method for extracting a portion of the image is shown in FIG. 1B where a variable portion is extracted. This method has the advantage that a potential counterfeiter would have greater difficulty identifying the area of the printed image which is critical. However, it requires that additional information be included on the identification card, preferably incorporated with the second signal, in order that the extracted portion may be properly superimposed during the verification process as will be described further below. In FIG. 1B the extracted portion is identified in terms of distances d1 and d2 from the right and upper edges of the image, and the extracted portion is presumed to be of a fixed size and horizontal orientation.

One way to select a variable portion of the image is simply to select a portion randomly, that is in such a way that it is not possible to determine which portion has been selected by examination of the identification card. Another way is to select a portion with respect to a prominent feature of the image. For example, the portion might be selected as a portion of predetermined size and shape around the eyes in the person's image.

Those skilled in the art will recognize that the ability to identify prominent features in an image of known type, such as identifying the eyes in the image of a person's face, is a relatively simple application of well known signal processing technology, not significantly greater than that exhibited by commercially available bill changers, and a further description of such technology is not believed necessary for an understanding of the subject invention.

FIG. 1C shows a third method for extracting a portion of the image, where the extracted portion is an abstract derived from the image. Such an abstract may be formed, for example, by converting the boundaries between regions of high contrast into lines and processing only the resulting information. In essence the image is "traced" to produce a new image similar to a line drawing or etching. Such an abstraction greatly reduces the amount of information contained in the image while still preserving selected characteristics so that the image is still easily identifiable.

Technology for abstraction of images is available from the Marathon Systems Research Corporation of Minneapolis Minnesota under the trade name "Phototrace", and need not be discussed further here for an understanding of the subject invention.

The extracted portion of the first signal is then input to a compression module 16 where it is compressed to reduce the amount of data which must be stored on identification card C.

Data compression algorithms, specifically adapted for compression of video image signals, are known to those skilled in the art. Preferably, an algorithm known as the JPEG algorithm, which is known and commercially available is used in compressor 16. Further description of the operation of compressor 16 is not believed necessary to an understanding of the subject invention.

The compressed first signal is then input to an encrypter 20 to be included in the encrypted second signal which will be incorporated into identification card C, as will be described further below. Preferably encrypter 20 encrypts the second signal using an encryption key, $E_i$, for a public key encryption system such as the well known RSA system.

The encrypted second signal is then encoded in accordance with some predetermined format by coder module 22, which controls code generator 24 to incorporate the encoded encrypted second signal in a portion of identification card C.

In accordance with a preferred embodiment of the subject invention extractor module 15, compressor module 16, encrypter module 20, and coder module 22 are implemented as software modules in a microprocessor; which is preferably, an Intel model 80386, or equivalent, or higher capacity microprocessor.

The digitized first signal is also input to printer 20 which may use any appropriate technology for the production of identification card C to print an image of the person O on front CF of identification card C. Front CF and back CB are then combined and laminated using well known technology by laminator 32 to produce identification card C.

In accordance with another preferred embodiment of the subject invention text input 30 is used to input a text message. In one embodiment of the subject invention at least a portion of the text message is combined with the compressed form of the first signal to form the second signal which is encrypted by encrypter module 20 and is also printed as plain text on the front CF of card C. Alternatively, text T may be compressed; as for example by deletion of control characters, which are restored in accordance with a predetermined format when text T is recovered, before text T is incorporated into the second signal. Thus, like image I text T is embodied in card C in both human recognizable form on the front CF an coded form on the back CB of card C. In another embodiment the text message may include a password P which would be encrypted and coded but which would not be printed in plain text on front CF.

In a preferred embodiment of the subject invention a center 40 transmits encryption code $E_i$ to encrypter module 20. In order to increase the security of identification card C key $E_i$ maybe changed from time to time. For the highest level of security key $E_i$ maybe changed for each card C produced, or a different key may even be used to encrypt different portions of the second signal. Or where multiple stations having apparatus 10 are used each station may use a different key $E_i$.

To facilitate decryption of the second signal in an environment where key $E_i$ is frequently changed, and/or multiple stations having different keys exist, center 40 also transmits an encrypted decryption key $E_S[D_i]$ to be appended to the encrypted second signal by coder module 22. Thus, as will be seen below, when card C is to be validated the necessary decryption key $D_i$ can be obtained by decrypting $E_S[D_i]$.

Typically, encryption/decryption pair $E_S$, $D_S$ are generated by station 40 and will remain substantially constant during operation of system 10. However, in applications where system 10 is used to produce identification cards C for various organizations different pairs $E_S D_S$ may be used for different organizations.

Turning now to FIG. 3 apparatus 50 for validating an identification card C is shown. Magnetic strip MS of card C is scanned by magnetic card scanner 52 having the capability to scan strip MS. The scanned signal is then decoded by decoder module 54 and decrypted by decrypter module 58. In a preferred embodiment of the subject invention decrypter 58 stores decryption key $D_S$ which is used to decrypt encrypted key $E_S[D_i]$ to obtain decryption key $D_i$. Key $D_i$ is then used to decrypt the decoded signal scanned from strip MS.

Key $D_S$ is obtained by decrypter 58 from center 40. Typically, $D_S$ will remain constant during operation of system 50, as described above, and a direct communication link between system 50 and center 40 is not necessary and key $D_S$ maybe transmitted in any convenient manner. However, in one application, where identification card C has a predetermined expiration date it may be desirable to change key $D_S$ after the expiration date and if such expiration dates occur sufficiently often a direct communication link to center 40 maybe included in system 50.

The decrypted scan signal is then expanded in by an algorithm complimentary to the compression algorithm used in system 10, in a conventional manner which need not be described further for an understanding of the subject invention.

In a preferred embodiment of the subject invention decoder module 54, decrypter module 58, and expander module 60 maybe implemented as software modules in a microprocessor 61.

The decrypted, expanded signal is then displayed by display 62. Display 62 is a stereographic superpositioning display which preferably incorporates a conventional liquid crystal display (LCD) similar to those commonly used in wristwatches. Card C is positioned behind display 62 and guides or other suitable means are provided so that image I is in proper registration with displayed representation RI.

Display 62 is controlled so that it switches, approximately 2 to 4 times a second between a transparent state and displaying representation RI. The transition is made quickly enough that it appears instantaneous to the human eye. As a result small differences between displayed representation RI and image I will appear to flicker and may be easily detected. Other techniques for achieving stereographic superposition such as the user of rotating mirrors, half-silvered mirrors and shutters will be readily apparent to those skilled in the art.

In another preferred embodiment image I may be scanned to produce a video signal and that video signal and displayed representation RI may be electronically switched on a conventional video display to achieve stereographic superposition.

The display includes a representation RI the extracted portion of image I and the text message T which was included in the encrypted second signal scanned from card back CB. The display may also include a password P, which is known to the person O authorized to have card C, but which is not included on card C, as described above.

To validate card C the user simply observes the stereographic superposition of displayed representation RI and image I, and if no flicker is observed, may have a high degree of confidence that card C has not been counterfeited or tampered with. The identity or status of object O may then be confirmed by comparison of image I and object O.

Those skilled in art will be aware that control of display 62 so that displayed representation RI is displayed in the proper representation and is switched at the proper frequency with the proper speed of transition is a routine matter well within the skill of those skilled in the art, and need not be discussed further here for an understanding of the subject invention.

In an embodiment incorporating a password, password P is shown on display 62 but, of course, is not printed on card front FC. Password P is known to person O authorized to have possession of card C. Once card C is validated by comparison of image I and text message T printed on card front CF with representation RI and the text message T as shown on display 62 then the identity of the person O carrying card C maybe confirmed by comparison of person O with image I, as well as testing person O for knowledge of password P. Text message T will then confirm the identity of person O and may also confirm the status or characteristics of person O.

The preferred embodiments described above have been given by way of example only, and other embodiments of the subject invention will be apparent to those skilled in the art from consideration of the detailed descriptions set forth above and the attached drawings. Particularly, the extracted portion has been shown as a single unitary image for convenience of explanation but may also comprise multipart, discontinuous elements. Accordingly, limitations on the subject invention are to be found only in the claims set forth below.

What is claimed is

1. A method of identifying an object, or other entity comprising the steps of:
    a) scanning said object or other entity to produce a first signal representative of an image of said object or other entity;
    b) printing said image on first part of an identification card;
    c) encrypting a second signal, comprising a representation of a portion of said image, said portion including less than the whole of said image, and said second signal being derived at least in part from said first signal;
    d) incorporating a coded representation of said encrypted second signal into a second part of said identification card;
    e) reading said coded representation of said second signal from said identification card;
    f) decoding said second signal
    g) decrypting said decoded second signal;
    h) inputting said decrypted second signal to a display to display said representation of said portion of said image; and
    i) superimposing said displayed representation of said portion of said image on said printed image; whereby
    j) said printed image can be compared to said displayed second image to validate said card.

2. A method as described in claim i wherein said displayed representation is stroboscopically superimposed on said image.

3. A method as described in claim 2 wherein said identification card is aligned behind a transparent LCD display screen and said displayed representation is displayed on said screen.

4. A method as described in claim 2 wherein said portion is selected as a fixed, predetermined portion of said image.

5. A method as described in claim 2 wherein said portion is a variable portion of said image and said second signal includes data identifying said variable portion.

6. A method as described in claim 2 wherein said portion is selected with respect to a feature of said image and said second signal includes data identifying said selected portion.

7. A method as described in claim 2 wherein said portion comprises an abstraction derived from said image.

8. A method as described in claim 2 wherein said second signal is encrypted using an encryption key, $E_i$, for a public key encryption system; and wherein a decryption key, $D_i$, corresponding to said encryption key, $E_i$, is encrypted with a second encryption key, $E_S$, for said public key encryption system to form an encrypted decryption key, $E_S$; and wherein said encrypted decryption key, $E_S$ is appended to said encrypted second signal prior to incorporation into said second part.

9. A method as described in claim 2 wherein said port,on is selected to be a part of said image which is sufficiently small that said second signal can be incorporated on a magnetic strip or said identification card.

10. A method as described in claim 1 wherein said portion is selected as a fixed, predetermined portion of said image.

11. A method as described in claim 1 wherein said portion is a variable portion of said image and said second signal includes data identifying said variable portion.

12. A method as described in claim 1 wherein said portion is selected with respect to a feature of said image and said second signal includes data identifying said selected portion.

13. A method as described in claim 1.wherein said portion comprises an abstraction derived from said image.

14. A method as described in claim 1 wherein said second signal is encrypted using an encryption key, $E_i$, for a public key encryption system; and wherein a decryption key, $D_i$, corresponding to said encryption key, $E_i$, is encrypted with a second encryption key, $E_S$, for said public key encryption system to form an encrypted decryption key, $E_S$; and wherein said encrypted decryption key, $E_S$ is appended to said encrypted second signal prior to incorporation into said second part.

15. A method as described in claim 1 wherein said portion is selected to be a part of said image which is sufficiently small that aid second signal can be incorporated on a magnetic strip on said identification card.

16. A method for producing an identification card, comprising the steps of:
    a) scanning an object or other entity to produce a first signal representative of image of said object or other entity;
    b) printing said image on a first part of said identification card;
    c) encrypting a second signal comprising a representation of a portion of said image, said portion including less than the whole of said image, and said second signal being derived at least in part from said first signal;
    d) incorporating a coded representation of said encrypted second signal into a second part of said identification card: wherein
    e) said portion is a variable portion of said image and said second signal includes data identifying said variable portion, said portion comprising an abstraction derived from said image, or a portion selected with respect to a feature of said image, where said second signal includes data identifying said selected portion.

17. A method as described in claim 16 wherein said second part comprises a magnetic stripe.

18. A method as described in claim 16 wherein said second signal is encrypted using an encryption key, $E_i$, for a public key encryption system; and wherein a decryption key, $D_i$, corresponding to said encryption key, $E_i$, is encrypted with a second encryption key, $E_S$, for said public key encryption system to form an encrypted decryption key, $E_1$; and wherein said encrypted decryption key, $E_S$ is appended to said encrypted second signal prior to incorporation into said second portion.

19. Apparatus for producing an identification card, comprising:
    a) scanning means for producing a first signal representative of an image of an object or other entity to be identified by said identification card;
    b) printing means, responsive to said scanning means, for printing said image on a first part of said identification card;
    c) extracting means for extracting a portion of said first signal representative of a portion of said image, said portion of said image including less than the whole of said image;
    d) encrypting means for encrypting a second signal, said second signal being derived at least in part from said portion of said first signal, and comprising a representation of said portion of said image,
    e) coding means for incorporating a coded representation of said encryption of said second signal into a second part of said identification card wherein; paragraph f) said portion is a variable portion of said image and said second signal includes data identifying said variable portion, a portion comprising an abstraction derived from said image, or a portion selected with respect to a feature of said image and said second signal includes data identifying said selected portion.

20. Apparatus as described in claim 19 further comprising means for compressing said first signal.

21. Apparatus for validating an identification card, said card having an image of an object or other entity to be identified on first part of said card and a coded representation of an encrypted signal comprising a representation of a portion of said image incorporated in a second part of said card, said portion of said image including less than the whole of said image comprising:
    a) means for reading said coded representation of said signal from said card
    b) decoding means, responsive to said reading means for decoding said coded representation of said signal;
    c) decrypting means, responsive to said decoding means, for decrypting said decoded representation of said signal, and,
    d) display means, responsive to said decrypting means, for displaying said representation of said image superimposed on said image; whereby, e) said card can be validated by comparison of said image on said first portion of said card with said displayed representation of said portion of said image.

22. Apparatus as described in claim 21 wherein said display means further comprises means for stroboscopically superimposing said displayed representation on said image.

23. Apparatus as described in claim 22 wherein said portion of said image is a fixed predetermined portion.

24. Apparatus as described in claim 22 wherein said portion of said image is a variable portion of said image and said second signal includes stat identifying said variable portion.

25. Apparatus as described in claim 22 wherein said portion of said image is selected with respect to a feature of said image and said second signal includes data identifying said selected portion.

26. Apparatus as described in claim 22 wherein said portion of said image comprises an abstraction derived from said image.

27. Apparatus for validating an identification card, said card having an image of an object ore other entity to be identified on first part and a coded representation of an encrypted signal comprising a representation of a portion of said image incorporated in a second part of said card, said portion including less than the whole of said image, comprising:

a) a means for reading said coded representation of said signal from said card b) decoding means, responsive to said reading means for decoding said coded representation of said signal;

c) decrypting means, responsive to said decoding means, for decrypting said decoded representation of said signal, and, d) display means, responsive to said decrypting means, for displaying said representation of said image superimposed on said image; whereby, e) said card can be validated by comparison of said image on said first part of said card with said displayed representation of said portion of said image.

28. An identification card, comprising:

a) a first part having thereon an image of an object or other entity to be identified by said identification card; and b) a second part incorporating an encoded representation of an encrypted signal comprising a representation of a portion of said image; wherein, c) said portion is a variable portion of said image and said identification card includes data identifying said variable portion, a portion selected with respect to a feature of said image and said identification card includes data identifying said selected portion, or is a portion comprising an abstraction derived from said image.

* * * * *